T. G. PALMER.
GAS HEATER.
APPLICATION FILED DEC. 20, 1915.
1,196,019.
Patented Aug. 29, 1916.
2 SHEETS—SHEET 1.
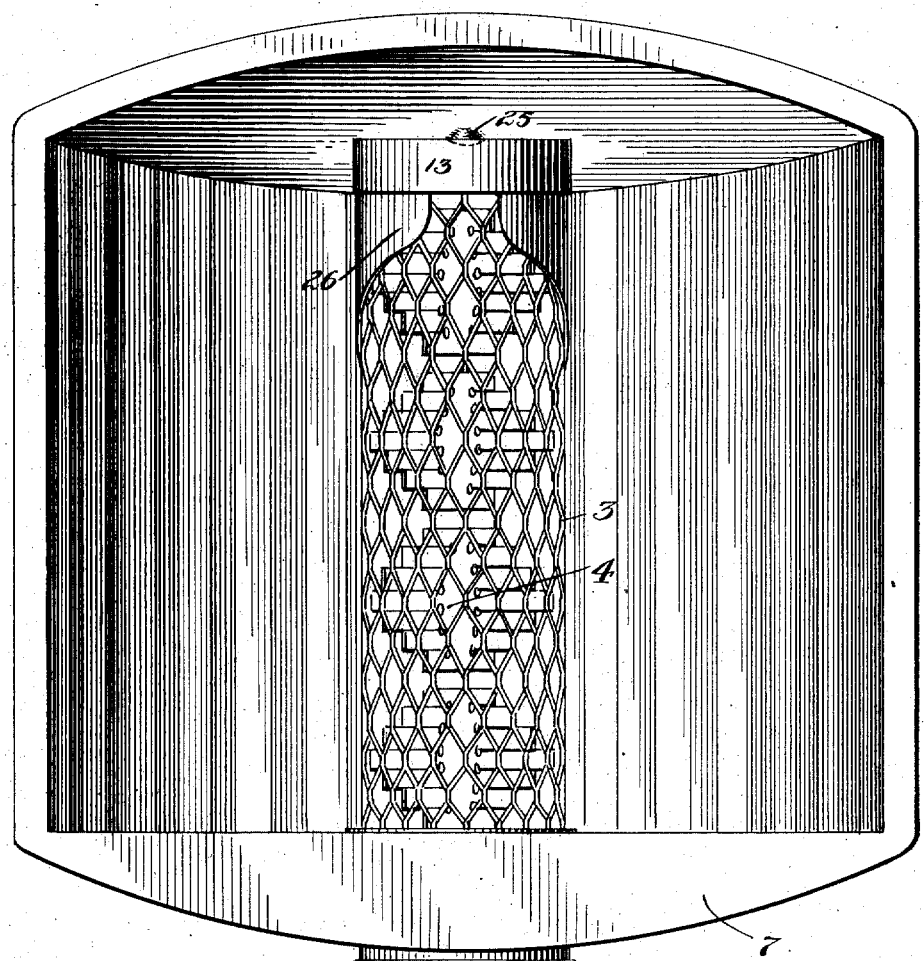
Fig. 1.
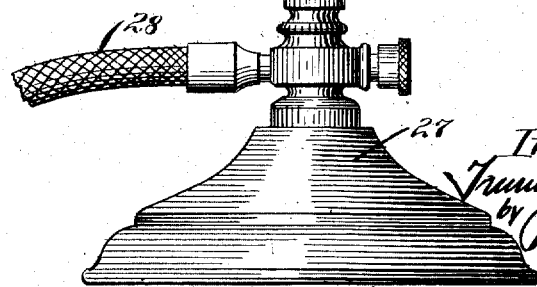

T. G. PALMER.
GAS HEATER.
APPLICATION FILED DEC. 20, 1915.

1,196,019.

Patented Aug. 29, 1916.
2 SHEETS—SHEET 2.

Inventor
Truman G. Palmer
by
attys

UNITED STATES PATENT OFFICE.

TRUMAN G. PALMER, OF CHICAGO, ILLINOIS.

GAS-HEATER.

1,196,019.　　　　Specification of Letters Patent.　　Patented Aug. 29, 1916.

Application filed December 20, 1915. Serial No. 67,790.

*To all whom it may concern:*

Be it known that I, TRUMAN G. PALMER, a citizen of the United States, residing at Chicago, county of Cook, and State of Illinois, have invented certain new and useful Improvements in Gas-Heaters; and I do hereby declare the following to be a full, clear, and exact description of the invention, such as will enable others skilled in the art to which it appertains to make and use the same.

This invention relates to improvements in gas heaters of the type shown in my prior Patent, No. 1,125,387, of Jan. 19, 1915, and has for its object to provide such a heater having the improvements hereinafter set forth.

In the above-mentioned patent a heater is disclosed comprising a burner having a gallery associated therewith, a foraminous heating cylindrical shell supported by the gallery of the burner, a baffle axially disposed in said shell and a reflector supported upon the gallery of the burner for reflecting the heat into the compartment to be heated. The upper and lower ends of the foraminous shell are reinforced by telescoping sheet-metal sleeves and the baffle is supported by the innermost of such sleeves.

In the improved form of the heater herein disclosed, the construction of the above-mentioned sleeves for reinforcing and maintaining the shape of the foraminous shell is somewhat changed and the baffle is supported within the shell in a somewhat different manner. Furthermore, the foraminous heating shell and the reflector are supported by the gallery in a simplified and more efficient manner.

Certain other improvements in the details of construction will appear as the specification proceeds.

The invention is illustrated in the accompanying drawings, in which:—

Figure 3:
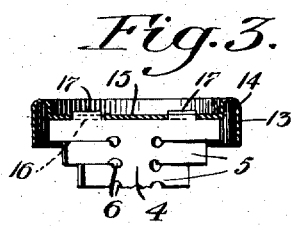
Figure 4:
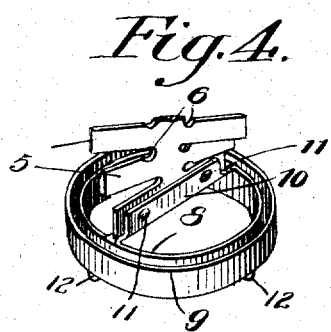
Figure 5:
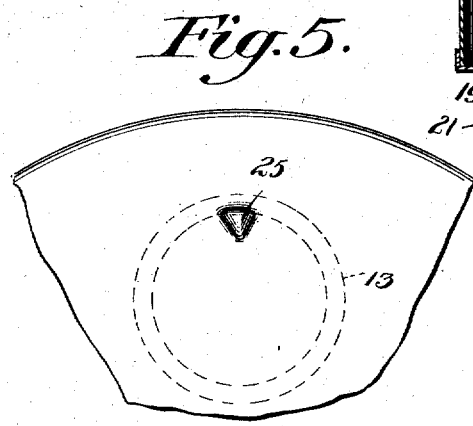
Figure 2:
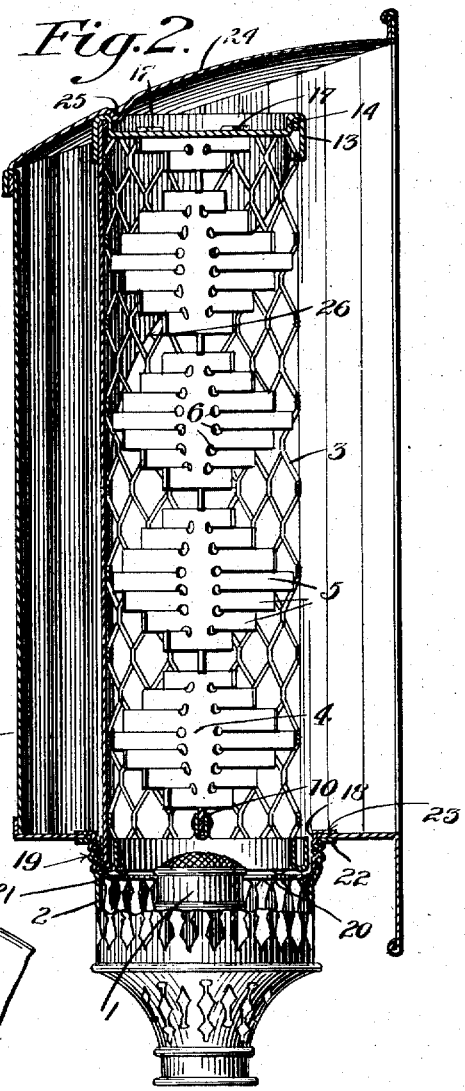

Figure 1 is a front elevation of the improved heater; Fig. 2 is a vertical transverse section of the heater removed from its base; Fig. 3 is a detail view, partly in section, showing the construction of the upper cap for maintaining the shape of the foraminous shell and illustrating the manner of connecting the upper end of the baffle thereto; Fig. 4 is a detail perspective view of the lower cap for supporting the lower end of the foraminous shell and maintaining the shape thereof and illustrating the manner of connecting the lower end of the baffle to such cap; and Fig. 5 is a broken plan view of the top of the reflector illustrating the means employed for holding the heating shell in an upright position.

Referring particularly to Figs. 1 and 2, it will be seen that the heater comprises a burner 1, which may be of the Bunsen type, and a gallery 2 associated therewith. Supported over the burner 1, in the manner hereinafter described, is a cylindrical heating shell 3 of foraminous metal which may be similar in all respects to the foraminous shell shown in the above-mentioned prior patent. Supported in the shell 3 and coaxially disposed therewith is a baffle 4 which is slitted transversely along its edges and then twisted to form a plurality of staggered and radially projecting fins 5. The baffle 4 serves the same purpose as the similarly constructed baffle in said prior patent in dividing the flame and effecting a uniform heating of the heating shell. The baffle is slightly modified in the present instance to facilitate twisting of the baffle and to permit the radial fins 5 to freely move relative to each other when the baffle is twisted. For this purpose, the baffle is provided with perforations 6 at the inner extremities of the slits forming the fins. As best shown in Fig. 4, each of these perforations 6 is so formed at the inner extremity of each slit in the baffle that it constitutes a circular opening at the extremity of the slit which prevents the fins from interfering with each other when the baffle is twisted and also facilitates the twisting of the baffle.

The reflector above referred to for reflecting the heat into the compartment to be heated is denoted generally by the reference character 7, and, in the present instance, is supported by the gallery 2 in the improved manner hereinafter described.

The telescoping lower sleeves of the prior patent for the lower end of the shell are, in the present instance, replaced by a lower cap formed from a single piece of sheet-metal and comprising an inner sleeve 8 and an outer integral sleeve 9, forming between them a circular recess to receive the lower edge of the foraminous shell, as shown in Fig. 2. Bridging the upper edges of the inner sleeve 8 is an integrally-formed channel-like portion 10 for receiving the lower end of the baffle 4 which may be riveted in said portion 10, as indicated at 11 in Fig. 4. The lower surface of the cap shown in Fig. 4 is provided with a plurality of struck-up projections 12 for the purpose of spacing the greater part of the cap from the gallery, as will hereinafter appear, to lessen the conduction of heat to the gallery and burner from the heating shell. The upper telescoping sleeves in my prior patent are replaced by an upper cap 13 formed from a single piece of sheet-metal and having a circular recess 14 to receive the upper edge of the heating shell. The cap 13 is provided with a horizontally disposed closure-like portion 15 which closes the top of the shell and it is this portion to which the upper end of the baffle is connected. This is accomplished by providing openings 16 in the web-like horizontal portion 15 of the cap and providing tongues 17 on the baffle for insertion through said openings. The tongues 17 when inserted through such openings are bent over, as best shown in Fig. 2, to lock the top of the baffle to the cap.

The shell with the baffle and upper and lower caps constructed as above described constitutes a unitary structure which is simply constructed and cheap to manufacture. The unit so formed may be readily removed from the heater and repositioned or replaced by a new unit, as the lower end of the shell merely rests within a cup-like sleeve 18 (Fig. 2) having threaded engagement with the upper edge portion 19 of the gallery 2. Said cup-like sleeve 18 when screwed into the upper portion of the gallery 2, forms a circular recess or depression to receive the lower end of the heating shell. It will be noted that the bottom of the sleeve 18 is provided with a circular opening 20 to accommodate the burner 1 and so as not to interfere with the passage of the flame toward the baffle 4. The lower edge portion of the baffle is supported upon that edge portion 21 of the bottom of the sleeve that is not cut away to form the opening 20, the projections 12 on the bottom of the lower cap serving to space said cap from the bottom of the sleeve 18, and thus lessen the conduction of heat from the heating shell to the gallery. The sleeve 18 is also utilized to clamp the reflector 7 to the gallery. This is accomplished by providing the upper edge portion of the gallery 2 with a supporting flange 22 and providing the sleeve 18 with a peripheral clamping flange 23 adapted when the cup-like sleeve 18 is positioned to coöperate with the flange 22 in clamping the bottom of the reflector to the gallery. It will be seen from Fig. 2 that the bottom of the reflector is supported upon the flange 22 of the gallery and is clamped thereon by means of the flange 23 of the sleeve 18.

The top 24 of the reflector is provided with a struck-out portion 25, behind which the rear circular edge of the upper sleeve 13 may snap when the heating shell is positioned to retain said shell in an upright position and to steady the same. The struck-out portion 25 may be of any desired shape just so it forms a downwardly extending projection behind which the edge portion of the shell may engage. The relation of this struck-out portion to the shell and the top cap and the position which the shell assumes with respect to the struck-out portion when the shell is positioned, is illustrated in Fig. 5.

It will now be noted that the heating unit comprising the foraminous shell, the upper and lower caps and the baffle supported thereby may be easily removed from the heater without disturbing the reflector or any of the other parts of the heater. In positioning the heating unit, the lower edge thereof is inserted in the cup-like sleeve 18 and the upper portion is forced behind the projection 25. The inherent resiliency of the parts of the heater will permit the heating unit to snap in place behind the projection 25 and will likewise permit removal of the heating unit from the heater.

In addition to the above described differences in construction between the heater herein disclosed and that shown in my prior patent, there is one other essential difference. In the present instance, there is provided a shield 26 which is mounted in any suitable manner, so that it will be interposed between the heating unit and the reflector and prevents the heat of the heating unit from injuring the reflector at the points where the reflector is subject to the most intense heat. In the construction herein illustrated, this shield is held against the surface of the heating shell by inserting its ends in the upper and lower caps of the shell. As will be noted from Figs. 1 and 2, the shield is relatively narrow at the lower portion of the shell and gradually becomes wider at the top of the shell and encircles the shell at its upper portion to a greater extent than at its lower portion.

The heater above described may be connected with any suitable source of gas supply, such as an ordinary gas fixture, or, as illustrated in the accompanying drawings, it may be supported upon a suitable base 27, the gas for the burner being supplied through a flexible tube 28. The specific construction of the base 27 constitutes no part of the present invention and need not be herein specifically described.

From the foregoing, it will be noted that the heater herein disclosed comprises improvements over that shown in my prior Patent No. 1,125,387, above-mentioned, which render the heater more practical, simpler, more efficient and less expensive to manufacture. Various changes, however, may be made in the details of construction as above described without departing from the spirit or scope of the invention, as defined in the accompanying claims.

What I claim is:—

1. A heater comprising a cylindrical heating shell, upper and lower caps for receiving the upper and lower edge portions of the shell, and a baffle axially disposed in said shell, said lower cap being open at its central portion but having a transversely-extending channel-like portion to receive the lower end of the baffle.

2. A heater comprising a cylindrical heating shell, upper and lower caps for receiving the upper and lower edge portions of the shell, a baffle axially disposed in said shell, said lower cap being opened at its central portion but having a transversely-extending portion integrally connected at each end to the cap and extending completely across said open central portion, means whereby the lower end of the baffle may be connected to said transversely-extending portion, and means whereby the upper end of the baffle may be connected with the upper cap.

3. A heater comprising a cylindrical heating shell, upper and lower caps for receiving the upper and lower edge portions of the shell, and a baffle axially disposed in said shell, said lower cap having a circular channel-like recess for receiving the lower edge portion of the shell and having an integrally-formed transversely-extending channel-like portion for receiving the lower end of the baffle.

4. A baffle for heaters of the kind described, comprising a strip of material slitted transversely along its edges and twisted to form a plurality of radially-extending and staggered fins, a portion of the material of the baffle at the extremity of each slit being removed, for the purpose described.

5. A baffle for heaters of the kind described, comprising a strip of material slitted transversely along its edges and twisted to form a plurality of radially-extending and staggered fins, the baffle at the extremity of each slit being perforated, for the purpose described.

6. A baffle for heaters of the kind described, comprising a strip of material slitted transversely along its edges and twisted to form a plurality of radially-extending and staggered fins, the baffle at the extremity of each slit being provided with a circular opening, for the purpose described.

7. A heater comprising a burner, a gallery associated therewith having a reflector-supporting flange, and an interiorly-threaded portion, a reflector supported by said flange, and a cup-like locking member adapted to be screwed into the interiorly-threaded portion of the gallery and having a clamping flange for clamping the bottom of the reflector to said reflector-supporting flange.

8. A heater comprising a burner, a gallery associated therewith, a heating shell, the gallery having a reflector-supporting portion and an interiorly-threaded portion, a reflector supported by said reflector-supporting portion, and a cup-like locking member adapted to be screwed into said interiorly-threaded portion of the gallery and having a clamping flange to clamp the bottom of the reflector to said reflector-supporting portion, said cup-like locking member being adapted to receive the lower end of the heating shell.

9. A heater comprising a burner, a gallery associated therewith, a reflector supported by the gallery, and a heating shell adapted to be operatively positioned with respect to the burner, the top of the reflector having a downwardly-extending projection behind which the upper edge of the heating shell is adapted to snap, for the purpose described.

10. A heater comprising a burner, a gallery associated therewith, a reflector supported by the gallery, and a heating shell adapted to be operatively positioned with respect to the burner, the top of the reflector having a downwardly-extending struck-out portion behind which the upper edge of the heating shell is adapted to engage, for the purpose described.

11. In a heater of the kind described, a heating shell and a lower cap for receiving the lower edge portion of said shell, said cap having a plurality of integrally-formed downwardly-extending projections, for the purpose described.

12. A heater comprising a burner, a gallery associated therewith and a heating unit adapted to be supported by said gallery, said unit having a plurality of projections formed as a component part of the heating unit to space the heating unit from the portion of the gallery on which it is supported.

13. A heater comprising a heating unit, a reflector, and a shield mounted at the rear of said shell to protect the reflector and constituting a component part of the heating unit.

14. A heater comprising a heating unit, a reflector, and a shield interposed between said heating unit and the reflector to protect the reflector from the heat of said unit.

In testimony whereof I affix my signature.

TRUMAN G. PALMER.